United States Patent Office 3,279,063
Patented Oct. 18, 1966

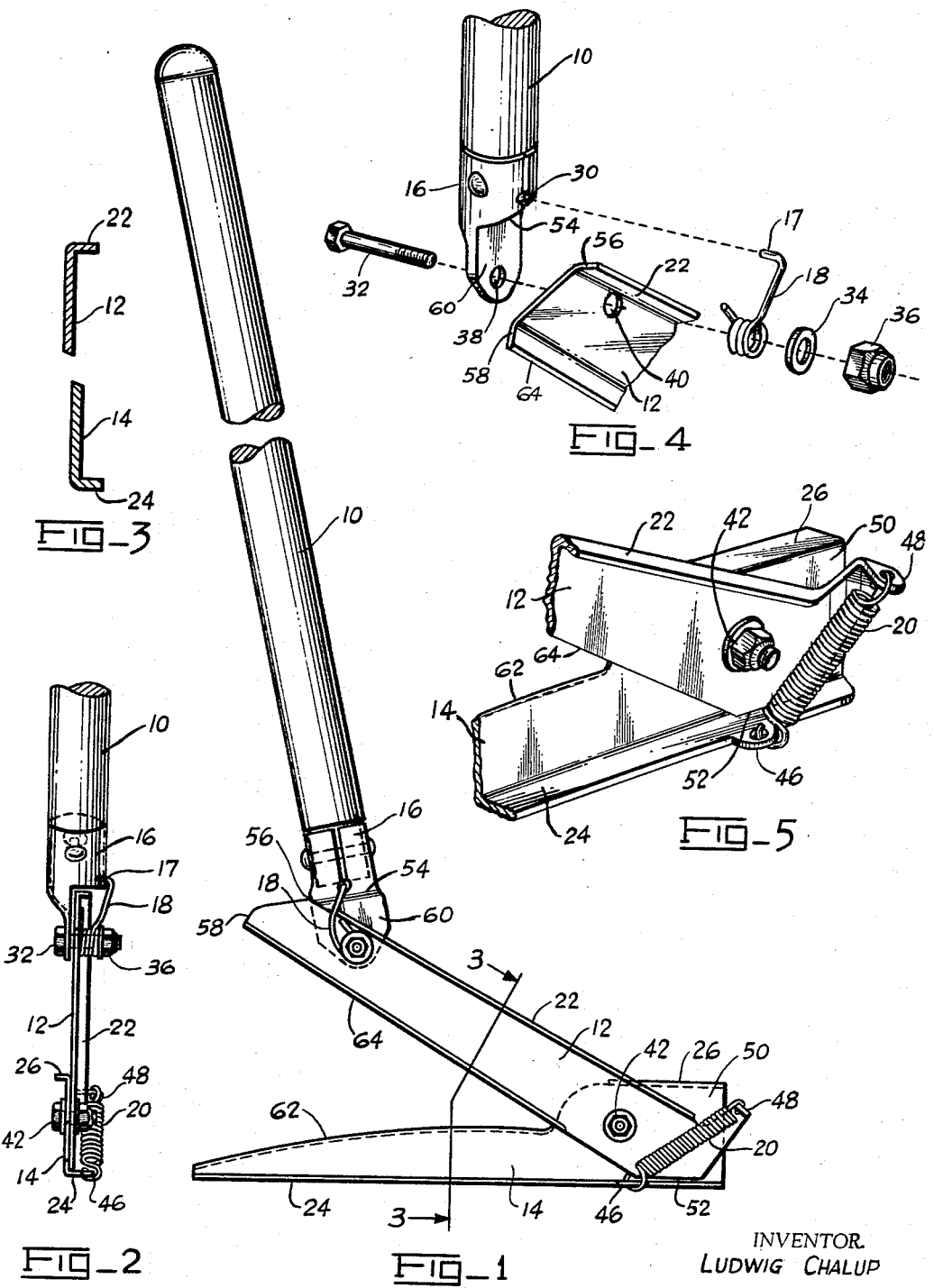

3,279,063
VEGETATION CUTTING TOOL
Ludwig Chalup, 612 Glenmont Drive,
Solana Beach, Calif.
Filed May 18, 1964, Ser. No. 368,157
3 Claims. (Cl. 30—253)

This invention pertains to a vegetation cutting tool and more particularly to a cutting tool that may be used to cut or trim grass, weeds, shrubbery, hedges and like vegetation that may be adjacent to base objects such as tree trunks, sidewalks, walls or the like.

It has been found advantageous to have a cutting and trimming tool with a long longitudinal handle that reduces the fatigue on the part of the user in bending over or reaching up. It has also been found advantageous to have a cutting and trimming tool that cuts when force on the handle is transmitted to the cutting blades, one of which is backed against an immovable base. It has further been found advantageous to have a cutting tool with a cutting blade capable of scooping under vegetation or between vegetation and a base object and cutting at any of a plurality of angles between the base cutting blade and the handle. It is found to also be advantageous to have a cutting tool that is light, economical to manufacture, and yet with the strength and stability required in a tool that cuts fairly heavy vegetation with a quick snap-like cutting action.

It is therefore the object of this invention to provide an improved vegetation cutting tool capable of providing the aforesaid advantages.

One embodiment of the vegetation cutting tool of this invention has a longitudinal handle with a detachable clasp on one end. The clasp has a flat portion and a shoulder portion. The flat portion is pivotally connected to one end of a first cutting blade, which first cutting blade is capable of pivotal movement in substantially the same plane as the longitudinal handle while in sliding contact with the flat portion of the clasp. This sliding contact provides stability to the first cutting blade in its plane of pivotal movement. The first cutting blade is connected at its opposite end to a second cutting blade. The second cutting blade is spring biased to a normal open position, which position maintains the second cutting blade at substantially a right angle to the handle member and in substantially the same plane.

The two cutting blades have longitudinal stiffening flanges that project at substantially right angles from the blades. The stiffening flange on the first cutting blade abuts the shoulder portion of the clasp, preventing further pivotal movement beyond a given point on the handle member. Resilient means connected between the first cutting blade and the handle biases the first cutting blade to a point of contact with the shoulder of the clasp.

The force transmitted by the handle member to the first cutting blade causes the first cutting blade to move against the second cutting blade when the second cutting blade is abutted against a curbing, tree trunk or the like. This force movement takes a generally circumferential direction around the connection point of the pivotally connected blades, thus taking mechanical advantage of the leverage action available in moving one of the ends of a scissor cutting blade towards the other blade.

The cutting blades have increased area of contact about their point of pivotal connection, thereby increasing the lateral stability of the blades in their plane of pivotal movement. The particular connection of the spiral spring is such as to assure that the spring maintains its position of exerting tension between the ends of the cutting blades on the side opposite the handle connection and between the respective blades.

Other objects and many attended advantages of this invention will be readily apparent as the same becomes better understood by reference to the following description, when considered in connection with the accompanying drawings, in which like reference numerals designate like parts throughout the figures thereof and wherein:

FIGURE 1 is a side view of a vegetation cutting tool of the invention with the cutting tool in the normally open position.

FIGURE 2 is a side view of the vegetation cutting tool shown in FIGURE 1, with part of the handle removed.

FIGURE 3 is a cross-section of the blades of the cutting tool of FIGURE 1, taken along lines 3—3.

FIGURE 4 is an exploded view of the means of connecting the first cutting blade to the handle.

FIGURE 5 is a perspective view of the pivotal connection of the first and second cutting blades.

Referring now to FIGURE 1, the vegetation cutting tool has an elongated, longitudinal handle 10 that may be made of wood or other suitable material. A bracket 16 is releasably connected to the end of handle 10 and has an inclined shoulder portion 54 and a recessed flat sliding contact portion 60. A longitudinal first cutting blade 12, that may be made of tempered steel or the like, is pivotally connected via aperture 40 and aperture 38 to the bracket 16 by a bolt 32, spring 18, washer 34 and nut 36. As can be seen, the first cutting blade 12 is drawn into sliding contact with surface 60. A spiral spring 18 contacts the stiffening flange 22 of the cutting blade 12 with the other projecting end 17 inserted into the retaining aperture 30 in the bracket 16.

The first cutting blade has a longitudinal stiffening flange 22 that runs substantially the length of the blade. The blade has a cutting surface 64 with the end 58 squared off for safety purposes.

A second cutting blade 14 is pivotally connected to the end of the first cutting blade 12 opposite the end connected to the handle means 10. The pivotal connection is accomplished by a bolt and lock washer connection at 42. The second cutting blade 14 has a longitudinal stiffening flange 24 that runs the length of the second blade and projects at a substantially 90° angle in the same direction as the stiffening flange 22. The cutting edge 62 of the second cutting blade 14 cooperates with the cutting edge 64 of the first cutting blade 12 to perform the cutting operation.

The second cutting blade 14 has an enlarged end portion 50 adjacent the aforesaid pivotal connection 42 for assuring that blade 12 will have a continuous area of sliding contact for maintaining stability of the two blades in the cutting plane. Blade 14 also has a further stiffening flange 26 on the enlarged portion that projects in the opposite direction of stiffening flange 24.

A longitudinal spiral tension spring 20 is connected between the first and second cutting blades to move the flattened portion 52 of the first cutting blade 12 against the flange portion 24, thus preventing further pivotal movement between the blades. Tabs 46 and 48 are outwardly projecting connection surfaces for receiving and holding the ends of the tension spring 20. Tab 48 is held by an outer extension portion of the first blade, which extension extends beyond the normal width of the blade 12. This extension increases the length of the spring 20 and further assures that throughout the pivotal movement of the blades, the spring will always be positioned on the same side of the pivoted connection 42. Flange 22 is cut out adjacent to spiral spring 20 to allow the spring to move inwardly during the pivotal movement.

As shown in FIGURE 1, the length of the handle is at an angle with the first cutting blade 12 and is at a substantially normal angle with blade 14. Thus, blade 14 in operation may be pulled along with the handle 10 to pass under or between the vegetation to be cut and a base member.

In operation, the cutting tool is inserted into the vegetation with the flange portion or foot 24 being positioned against a base member, such as a block wall, sidewalk, trunk of a tree, ground or other surface. The handle 10 is then pushed in a longitudinal direction against blade 12, causing blade 12 to rotate around the pivotal connection 42 with the cutting edge 64 contacting the cutting edge 62 and thereby cutting the vegetation. The force of handle member 10 is exerted on the end of the first cutting blade 12 and is directed in a substantially circumferential direction relative to the pivot point 42. This allows use of increased mechanical advantage in closing the cutting blades. Since the blades may rotate either around the pivot hole 38 of the handle 10 or around the pivot point 42, it may be seen that the tool is capable of cutting at virtually any angle relative to the handle within that pivoting movement allowed by the clasp 16. Also, it is readily evident that any type of surface may be used as a base member for the flange 24. Further, the cooperative action of the two springs provide a snap action cutting.

The foregoing description and accompanying drawings disclose a preferred embodiment of my invention. It is understood that various changes relative to the material, size, shape and arrangement of parts may be resorted to without departing from the spirit or scope of the invention defined in my claims.

Having best described my invention, I claim:

1. A vegetation cutting tool comprising,
   first and second longitudinal cutting blades being joined at adjacent ones of their ends for pivotal movement therebetween,
   one of said blades having a larger end portion than the other of said blades at said point of being joined and said cutting blades having longitudinal stiffening flanges on their opposite edges,
   said flange of said second cutting blade comprising a substantially longitudinal flat surface forming a foot for contacting a separate base member and limiting movement of said second cutting blade,
   spiral tension spring means connected to said second cutting blade at a point away from said one of said ends and to said first cutting blade at said one of said ends for biasing said blades to a normally open position,
   said first blade means having a portion extending outwardly from said side having said stiffening flange to which said spiral tension spring may be connected,
   longitudinal handle means pivotally connected adjacent to the other end of said first blade for transmitting force to said first blade, moving said blade into a closed cutting position with said second blade when said movement of said second blade is limited,
   said force having a direction circumferential to said point of joining said first and second cutting blades and being displaced from said point of joining by substantially the longitudinal length of said cutting blades,
   said first cutting blade having a flat portion for contacting said stiffening flange of said second cutting blade when pivoted preventing further pivotal movement therebetween,
   torquing spring means interconnected between said handle means and said first cutting blade for biasing said blade to a stop position on said handle means,
   said handle means having a shoulder portion,
   said stiffening flange of said first blade contacting said shoulder portion for limiting pivotal movement of said first blade relative to said handle means,
   and said second cutting blade having a normal open position at an angle substantially normal to said longitudinal handle means.

2. A vegetation cutting tool comprising,
   first and second longitudinal cutting blades being joined at adjacent ones of their ends for pivotal movement therebetween,
   one of said blades having a larger end portion than the other of said blades at said point of being joined and said cutting blades having longitudinal stiffening flanges on their opposite edges,
   said flange of said second cutting blade comprising a substantially longitudinal flat surface forming a foot for contacting a separate base member and limiting movement of said second cutting blade,
   spiral tension spring means connected to said second cutting blade at a point away from said one of said ends and to said first cutting blade at said one of said ends for biasing said blades to a normally open position,
   said first blade means having a portion extending outwardly from said side having said stiffening flange to which said spiral tension spring may be connected,
   longitudinal handle means pivotally connected adjacent to the other end of said first blade for transmitting force to said first blade, moving said blade into a closed cutting position with said second blade when said movement of said second blade is limited,
   said force having a direction circumferential to said point of joining said first and second cutting blades and being displaced from said point of joining by substantially the longitudinal length of said cutting blades,
   said first cutting blade having a flat portion for contacting said stiffening flange of said second cutting blade when pivoted preventing further pivotal movement therebetween,
   torquing spring means interconnected between said handle means and said first cutting blade for biasing said blade to a stop position on said handle means,
   said handle means having a clasp with a recessed sliding contact surface and a shoulder portion,
   said sliding contact surface being capable of contacting the flat surface of said first blade providing stability to said first blade in the plane of its pivotal movement,
   said stiffening flange of said first blade contacting said shoulder portion of said clasp for limiting pivotal movement of said first blade relative to said handle means,
   the end of said first blade that projects beyond said connection to said handle means being squared off,
   and said second cutting blade having a normal open position at an angle substantially normal to said longitudinal handle means.

3. A vegetation cutting tool comprising,
   first and second cutting blades each having two opposed ends with adjacently positioned ones of said ends being pivotally joined,
   a longitudinal spiral tension spring means connected between said first and second cutting blades for resiliently biasing said blades to a normally open position, handle means pivotally connected near the other end of said first blade for cooperating to move said blades to a more closed position, said handle means having means for limiting pivotal movement of said first blade relative to said handle means, and torquing spring means connected between said handle means and said first cutting blade for biasing said blades to a given pivotal position about said handle means in the plane of pivotal movement of said blades.

References Cited by the Examiner
UNITED STATES PATENTS

| | | | |
|---|---|---|---|
| 2,504,164 | 4/1950 | Sundstrant | 30—253 |
| 2,534,924 | 12/1950 | Northquist | 30—253 X |
| 2,776,535 | 1/1957 | Branske | 30—249 X |

WILLIAM FELDMAN, *Primary Examiner.*

J. C. PETERS, *Assistant Examiner.*